United States Patent [19]

Strobel et al.

[11] Patent Number: 5,089,212
[45] Date of Patent: Feb. 18, 1992

[54] APPARATUS FOR CONTROLLING THE POWER OUTPUT OF A NUCLEAR REACTOR

[75] Inventors: Reinhardt Strobel, Nuremberg; Jürgen Spohrer, Höchstadt, both of Fed. Rep. of Germany

[73] Assignee: Siemens Aktiengesellschaft, Munich, Fed. Rep. of Germany

[21] Appl. No.: 560,450

[22] Filed: Jul. 31, 1990

[30] Foreign Application Priority Data

Aug. 2, 1989 [DE] Fed. Rep. of Germany ....... 3925617

[51] Int. Cl.⁵ .............................................. G21C 7/06
[52] U.S. Cl. .................................... 376/237; 376/236; 376/224
[58] Field of Search ............... 376/327, 332, 236, 237, 376/354, 224

[56] References Cited

U.S. PATENT DOCUMENTS

| | | | |
|---|---|---|---|
| 3,481,832 | 12/1969 | Rickert | 376/224 |
| 3,652,394 | 3/1972 | Braun | 376/224 |
| 3,997,392 | 12/1976 | Brandes et al. | 376/236 |
| 4,863,678 | 9/1989 | Shockling et al. | 376/327 |

FOREIGN PATENT DOCUMENTS

| | | |
|---|---|---|
| 0054787 | 6/1982 | European Pat. Off. |
| 2248398 | 4/1973 | Fed. Rep. of Germany |
| 3009937 | 9/1981 | Fed. Rep. of Germany |
| 2219494 | 9/1974 | France |

OTHER PUBLICATIONS

Deutsches Atomforum e.V., Bonn 1988, H.-J. Zech: "Kernreaktoren".

Primary Examiner—Brooks H. Hunt
Assistant Examiner—Meena Chelliah
Attorney, Agent, or Firm—Herbert L. Lerner; Laurence A. Greenberg

[57] ABSTRACT

A nuclear reactor, such as advanced pressurized water reactor, with controlled power output includes a reactor core having a cross section in a given plane with a center of area and axes of symmetry passing through the center of area. A multiplicity of control elements are disposed in groups, each having at least one of the control elements. The control elements of each of the groups with more than one control element are joined together. The groups are symmetrical to at least two of the axes of symmetry. Drive mechanisms each move a respective one of the groups of control elements. Each of the control elements has a plurality of control rods. A support structure joins the control rods to one another. Fuel assemblies are disposed in groups. Each of the groups of control elements has a given number of control elements being associated with one of the groups of fuel assemblies having the given number of fuel assemblies. Other fuel assemblies with which the control elements are not associated surround the groups of fuel assemblies.

9 Claims, 3 Drawing Sheets

APPARATUS FOR CONTROLLING THE POWER OUTPUT OF A NUCLEAR REACTOR

The invention relates to an apparatus for controlling the power output of a nuclear reactor, in particular for the reactor core of an advanced pressurized water reactor, having a number of control elements each being movable by a drive mechanism, and each of the control elements including a plurality of control rods and a support structure joining the control rods to one another.

When taking the existing, time-tested technology of pressurized water reactors used in many nuclear power plants as a point of departure, substantially better utilization of the raw material used as a source of energy is attained in a so-called advanced pressurized water reactor by using novel fuel assemblies, along with slight changes to the pressurized water reactor core. In order to accomplish this, the average neutron energy in the reactor core must be increased. Since the water that moderates neutrons continues to be used simultaneously as a coolant, the average neutron energy in an advanced pressurized water reactor is shifted beyond the thermal range by reducing the ratio between the moderator volume and the fuel volume.

In a liquid-cooled reactor core, the fuel assemblies are disposed vertically in a generally cylindrical reactor pressure vessel that has a rounded or partly spherical cover or dome and a rounded or partly spherical bottom. The coolant flows from bottom to top through the reactor pressure vessel and simultaneously acts as a moderator. Each fuel assembly includes a bundle of fuel rods, which are guided in a grid or lattice assembled from spacers and are movably supported in a shared top and bottom piece. The fuel rods can expand between the top and bottom pieces retained in grid or lattice plates and are therefore not hindered in their axial temperature expansion.

In order to enable the fuel rods to receive uranium oxide as a fuel, they are constructed as tubes within which the fuel is hermetically sealed in pellet form.

Controlling the power output of the nuclear reactor is performed, among other means, by control rods that are driven to a variable depth into the active part of the reactor core. To this end, certain fuel assemblies include guide rods, inside which the control rods can be driven. However, during operation of the nuclear reactor, only a selected number of fuel assemblies is equipped with control rods. In order to reduce the number of control rod drive mechanisms, the control rods that are all associated with the same fuel assembly are coupled to a single drive rod above the fuel assembly through a shared support structure, known as a "spider". The drive rods of the control elements pass through the cover of the reactor pressure vessel to individual control element drive mechanisms at the outside. The locations of the control elements are typically symmetrically distributed over the cross-sectional area of the reactor core. The number of control elements is limited by the maximum allowable number of bores that can be provided in the reactor pressure vessel cover for the passage of the drive rods therethrough.

In contrast to the square cross-sectional structure of the fuel rod grid or lattice of the conventional pressurized water reactor, the fuel rod grid or lattice structure in the advanced pressurized water reactor is hexagonal in cross section. This permits a very small spacing between the fuel rods, so that on average more fuel is contained per unit of reactor core volume in an advanced pressurized water reactor than in the core of a conventional pressurized water reactor. Given unchanged dimensions of the reactor pressure vessel, the necessary compactness of the reactor core of an advanced pressurized water reactor makes for twice the number of fuel rods, as compared with a conventional pressurized water reactor, at only approximately half the active core height. In order to ensure reliable regulation and/or shutoff of the advanced pressurized water reactor, it is therefore necessary to provide a larger number of control elements per unit of cross-sectional area of the reactor core than in a conventional pressurized water reactor. On the other hand, as shown by such a configuration described in the journal "Kernreaktoren" [Nuclear Reactors] by H.-J. Zech, in Deutsches Atomforum, Bonn 1988, if the dimensions of the reactor pressure vessel are unchanged, then the number of drive rods for the control elements is limited, particularly because of the predetermined number of bores in the reactor pressure vessel cover.

It is accordingly an object of the invention to provide an apparatus for controlling the power output of a nuclear reactor, which overcomes the hereinafore-mentioned disadvantages of the heretofore-known devices of this general type and with which more control elements can be actuated in the reactor core of an advanced pressurized water reactor per unit of cross-sectional area than in a pressurized water reactor of the previously typical type, for a given number of control element drive mechanisms. The control elements should be distributed in such a way that they cover the area uniformly and symmetrically over the entire cross section of the reactor core, in order to compel uniform power distribution in the core.

With the foregoing and other objects in view there is provided, in accordance with the invention, a nuclear reactor, especially an advanced pressurized water reactor, with controlled power output, comprising a reactor core having a cross section in a given plane with a center of area and axes of symmetry passing through the center of area, a multiplicity of control elements disposed in groups, each of said groups having at least one of said control elements, said control elements of each of said groups with more than one control element being joined together, said groups being symmetrical to at least two of the axes of symmetry, drive mechanisms each moving a respective one of said groups of control elements, each of said control elements having a plurality of control rods, a support structure joining said control rods of a group to one another, fuel assemblies disposed in groups, each of said groups of control elements having a given number of control elements being associated with one of said groups of fuel assemblies having said given number of fuel assemblies, and other fuel assemblies with which said control elements are not associated, said other fuel assemblies surrounding said groups of fuel assemblies.

In accordance with another feature of the invention, each of said groups of control elements has 1, 2 or 3 control elements, and each of said groups of fuel assemblies has 1, 2 or 3 fuel assemblies.

In accordance with a further feature of the invention, the cross section of said reactor core is approximately circular, and each two of said axes of symmetry define an angle therebetween being an integral multiple of 30°.

In accordance with an added feature of the invention, the cross section of said reactor core is substantially circular, and said reactor core has a hexagonal fuel rod grid structure.

In accordance with an additional feature of the invention, the groups of control elements are a total of 61 groups of control elements having a total of 151 control elements, 13 of said groups of control elements each have one control element, 6 of said groups of control elements each have two control elements, and 42 of said groups of control elements each have three control elements.

In accordance with yet another feature of the invention, there are provided connecting pieces each having said control elements of a respective one of said groups detachably retained thereon and each being movable by a respective one of said drive mechanisms.

In accordance with yet a further feature of the invention, there is provided a multi-armed guide plate in which said connecting piece is guided.

In accordance with a concomitant feature of the invention, the multi-armed guide plate has adjacent arms defining an angle therebetween being a fraction of 360°, said fraction corresponding to the number of said arms.

An advantage of the apparatus for controlling the power output of a nuclear reactor according to the invention, is that with little engineering effort or expense, substantially more control elements per unit of cross-sectional area can be installed in the reactor core, for an unchanged number of control element drive mechanisms, by joining the control elements into groups.

A distribution of the control elements that covers the area and is symmetrical over the cross section of the reactor core is attained in accordance with the invention by providing that the drive rods of two or three control elements are joined together by being converted, through one connecting piece each, into one drive rod. Along with individually driven control elements, this enables a particularly advantageous geometrical configuration of the control elements to be provided over the reactor core cross section, with six axes of symmetry between which the angle is an integral multiple of 30°. Thus, in calculating the layout and monitoring the reactor core, a 30° portion can be used as the basis and then extrapolated for the entire core cross section. It is moreover possible for a number of fuel assemblies that suits given requirements to be provided with control rods, through the formation of groups having more than three control elements, locally or over the entire core cross section. The apparatus according to the invention is especially advantageous when a pressurized water reactor system is being converted into an advanced pressurized water reactor, because neither the reactor pressure vessel cover nor the control element drive mechanisms need be replaced.

Other features which are considered as characteristic for the invention are set forth in the appended claims.

Although the invention is illustrated and described herein as embodied in an apparatus for controlling the power output of a nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
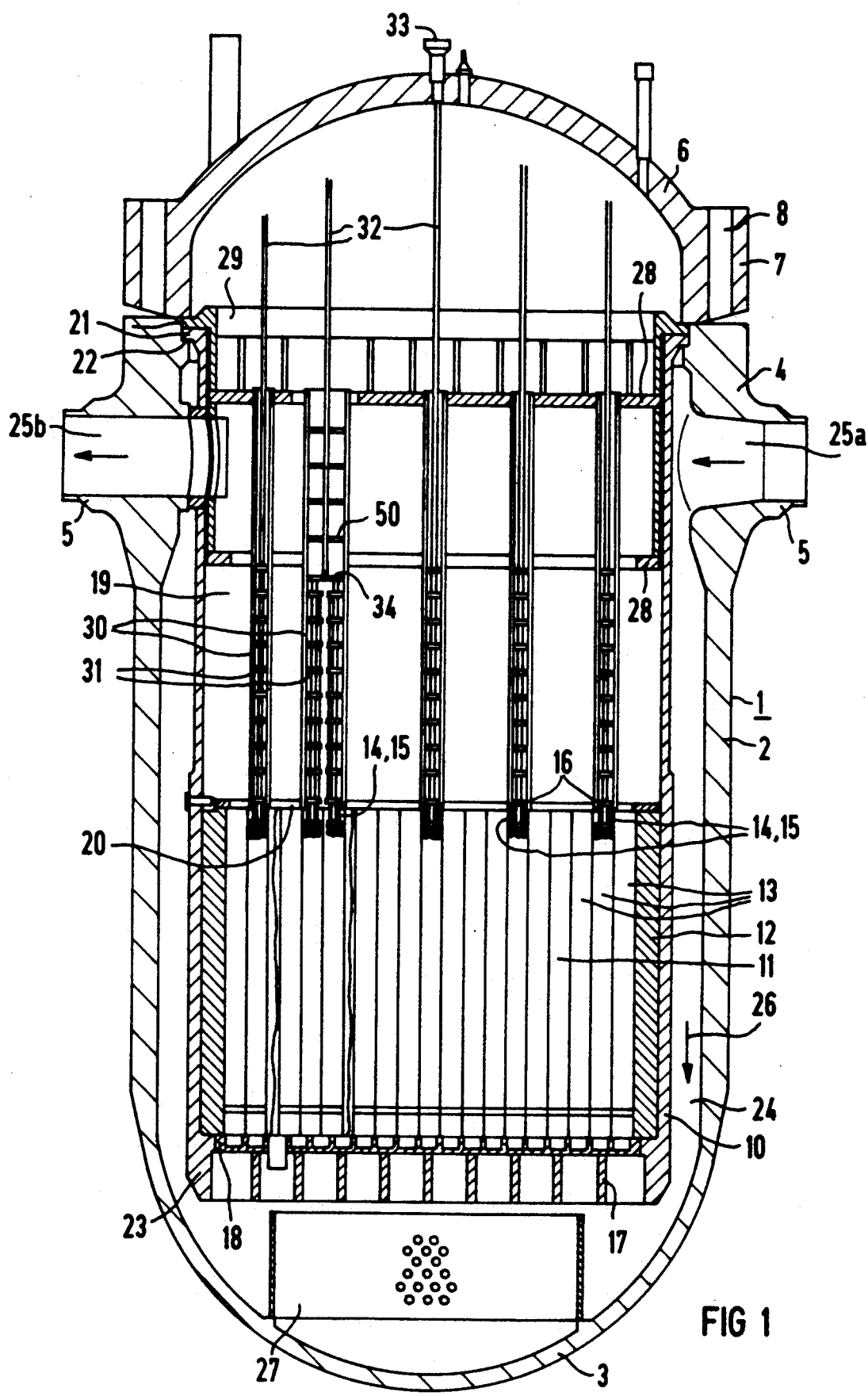
FIG. 1 is a diagrammatic, longitudinal-sectional view of a reactor core configuration in an advanced pressurized water reactor for 1300 MW, for example, with a core support structure therein.

Referring now in detail to the figures of the drawing in which parts that correspond with one another are provided with the same reference numerals and first, particularly, to FIG. 1 thereof, there is seen a reactor pressure vessel 1 for an advanced pressurized water reactor. The reactor pressure vessel 1 has a cylindrical shell 2 that is closed off at the bottom by a rounded or partly spherical bottom 3. A ring 4 with a connection neck or piece 5 for pipelines carrying coolant away from the reactor pressure vessel 1, is disposed in the vicinity of the shell 2. Seated above the ring 4 is a curved dome or cover 6, having a flange 7 which has bores 8 formed therein for receiving non-illustrated cover screws.

A core container or barrel 10 that encloses a reactor core 11 is disposed in the reactor pressure vessel 1. A core baffle or envelopment 12 is installed between the core container 10 and the reactor core 1 and protects the core container 10 from neutrons given off by the reactor core 11 during operation. The reactor core 11 includes individual fuel assemblies 13, a selected number of which are provided with control elements 14. Each control element 14 includes a bundle of control rods 15 and a support structure 16, also known as a spider, on which the control rods 15 are retained.

The fuel assemblies 13 are mounted on a lower grid or grating 17 in a lower grid or lattice plate 18. The fuel assemblies 13 are guided in an upper grid or lattice plate 20 on the lower surface of an upper core framework or support structure 19. For a 1300 MW plant, the reactor pressure vessel is approximately 12 m high, has an inside diameter of approximately 5 m, and has a wall thickness in the cylindrical portion of approximately 250 mm. The reactor pressure vessel has an empty weight of approximately 500 tons. The reactor pressure vessel 1 is constructed for an operating pressure of 175 bar and an operating temperature of approximately 350° C. In an advanced pressure water reactor, the ratio between the height of the reactor pressure vessel 1 and the height of the reactor core 11 is approximately 4:1.

The core container 10 has a flange 21 which is suspended in the reactor pressure vessel 1 from an inner shoulder 22 of the ring 4. The lower end of the core container 10 has an inwardly pointing flange 23, from which the lower grid 17 is suspended.

The core container 10 is cylindrical like the shell 2 of the reactor pressure vessel 1 and it forms an annular chamber 24 together with the shell 2, that carries coolant flowing in at a coolant inlet 25a, downward in the direction of an arrow 26. There the coolant is deflected at the rounded bottom 3, so that it enters the reactor core 11 from the bottom through the lower grid 17 and flows out of the reactor pressure vessel 1 through a coolant outlet 25b. Since the deflection would concentrate the flow to the middle region of the core, a sieve, strainer or screen barrel 27 supported on the rounded bottom 3 is provided in order to make the flow uniform over the cross section of the reactor core 11

Centering grids or lattices 28 are additionally disposed in the upper core framework 19 of the advanced pressurized water reactor. The centering grids 28, together with an upper core support grid or lattice 29 and guide tubes 30, form a removable insert. The interiors of the guide tubes 30 are provided with guide plates 31 in which drive rods 32 for the control elements 14 are guided. The guide rods 32 pass through the rounded cover 6 to control element drive mechanisms 33, only one of which is shown in the drawing. According to the invention, some of the guide tubes 30 are constructed in such a way as to guide a group of a plurality of control elements 14. FIG. 1 also shows a guide tube 30 for a group of two control elements 14. The guide rods 32 of the control elements 14 of such a group are converted into one guide rod 32 through a connecting piece 34.

Figure 2:
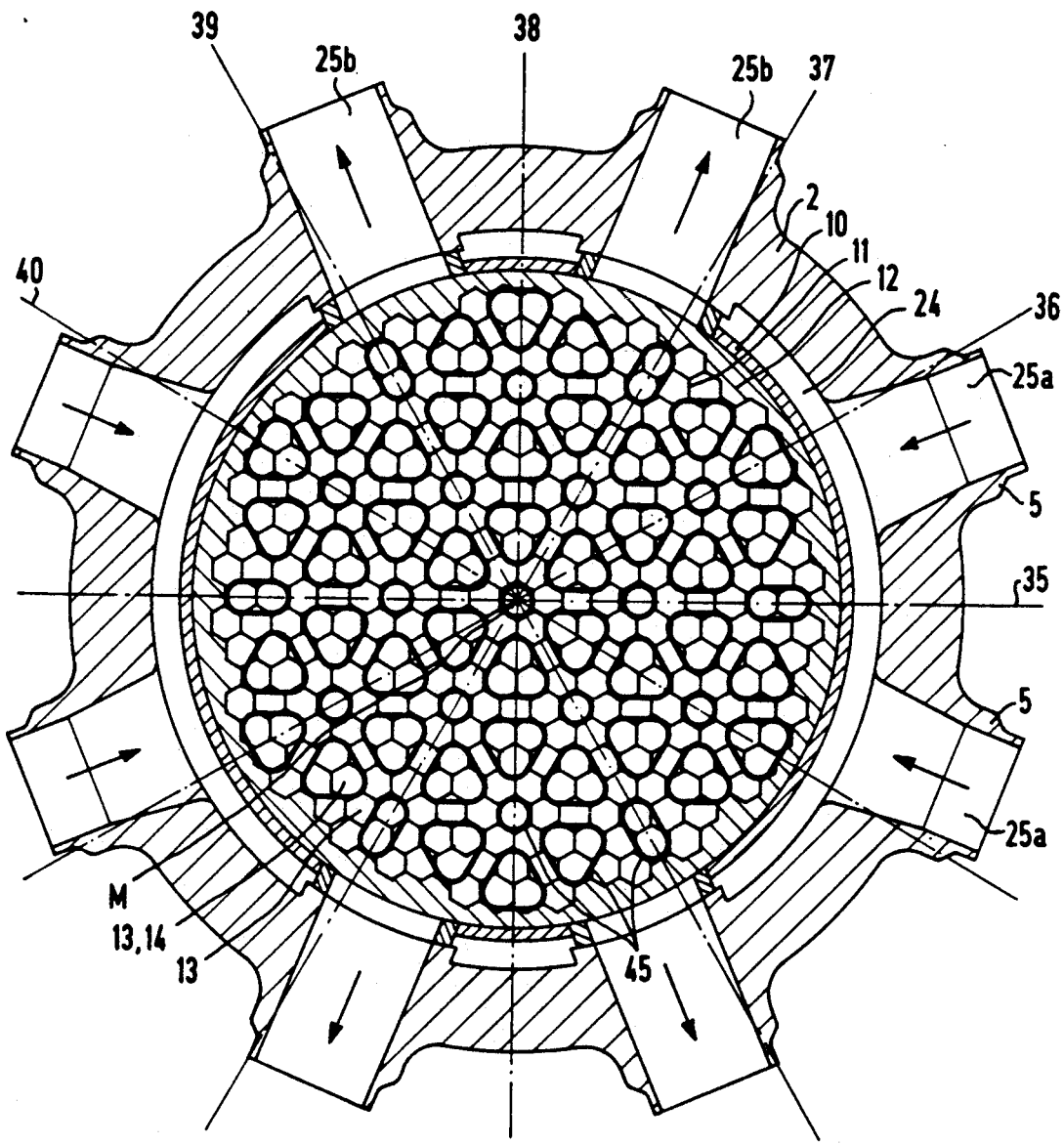
FIG. 2 is a cross-sectional view of the reactor pressure vessel of FIG. 1 in which fuel assemblies both with and without control elements are distributed according to the invention.

In FIG. 2, the reactor pressure vessel 1 of FIG. 1 is shown in cross section, with a fuel rod grid or lattice structure having a hexagonal cross section. If a rectangular coordinate system having an origin at a center of area M of the reactor pressure vessel 1 is placed in the plane of the drawing, then the abscissa represents a 0° axis 35, and the ordinate represents a 90° axis 38. The reactor pressure vessel 1 is provided with eight connection necks or pieces 5 for carrying coolant in four primary coolant loops. The coolant inlets 25a and the coolant outlets 25b are disposed in mirror symmetry relative to the axes 35 and 38. In this exemplary embodiment, the reactor core 11 surrounded by the core baffle 12 includes 349 fuel assemblies 13 with hexagonal cross sections, 151 of which are provided with control elements 14. The control elements 14 that are combined into groups according to the invention and are associated with a selected number of fuel assemblies 13, are represented in the drawing by outlines 45.

As FIG. 2 shows, beginning at the center of area M, six groups each having three control elements 14, are disposed about a group having a single control element 14. Each group is surrounded by fuel assemblies 13 that are not provided with control elements 14. In the peripheral region of the reactor core 11, groups each having two control elements 14 are additionally geometrically disposed on the 0° axis 35 and on axes 37 and 39 that are shifted relative thereto by an integral multiple of 60°. For the sake of providing an area-covering, symmetrical distribution of the 151 control elements 14 over the entire cross section of the reactor core 11, thirteen groups each having one control element 14, six groups each having two control elements 14, and forty-two groups each having three control elements 14, are advantageously provided.

The resultant disposition of fuel assemblies 13 provided with control elements 14 is symmetrical to six axes 35-40, having an angle therebetween which is an integral multiple of 30°. When constructing the reactor core 11, the part of the calculation relating to geometry can thus be limited to an arbitrary 30° portion, since each of the axes 35-40 is a mirror axis.

Figure 3:
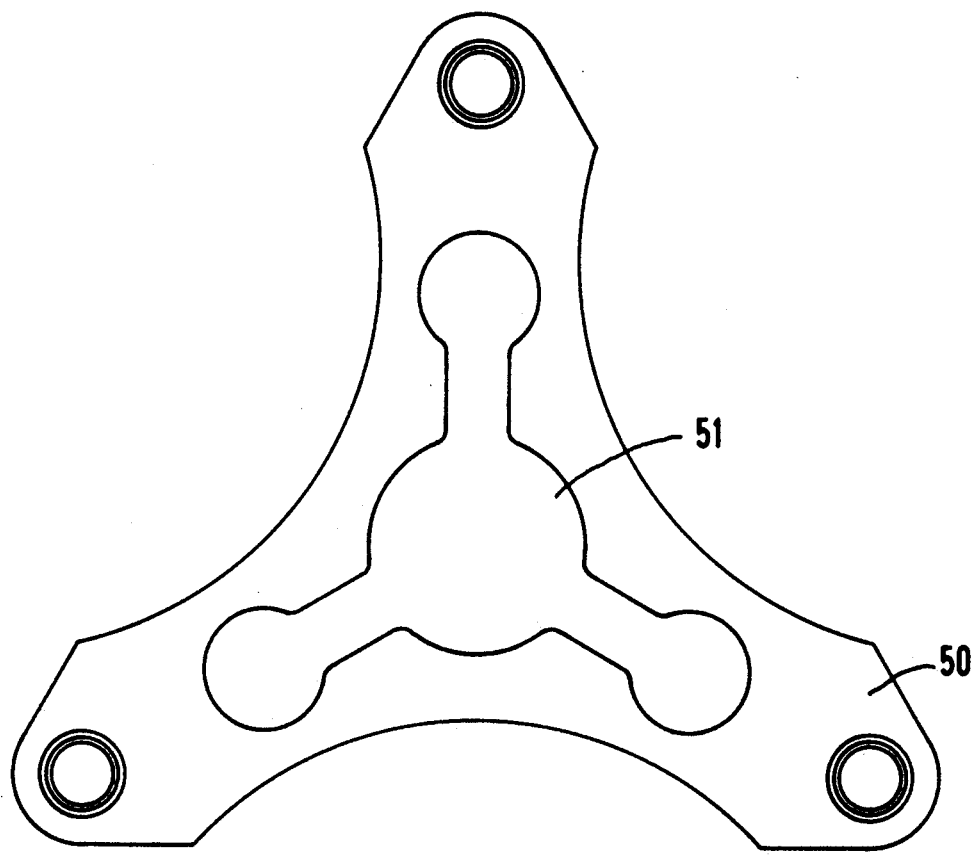
FIG. 3 is an enlarged plan view of a guide plate for a connecting piece that supports three control elements.

In FIGS. 1 and 3, a three-armed guide plate 50 is shown, in which adjacent arms each form an angle of 120° with one another. The guide plate 50 serves to guide a connecting piece 34, with which three drive rods 32 of three control elements 14 are converted into a single guide rod 32. To this end, the guide plate 50 is recessed with a profile 51 that matches the connecting piece 34.

We claim:

1. Nuclear reactor with controlled power output, comprising a reactor core having a cross section in a given plane with a center of area and axes of symmetry passing through the center of area, a multiplicity of control elements disposed in groups, each of said groups having more than one of said control elements, means for joining together said control elements of each of said groups, said groups being symmetrical to at least two of the axes of symmetry, drive mechanisms each moving a respective one of said groups of control elements, each of said control elements having a plurality of control rods, a support structure joining said control rods of a control element to one another, fuel assemblies disposed in groups, each of said groups of control elements having a given number of control elements being associated with one of said groups of fuel assemblies having the given number of fuel assemblies, and other fuel assemblies with which said control elements are not associated, said other fuel assemblies surrounding said groups of fuel assemblies.

2. Nuclear reactor according to claim 1, wherein each of said groups of control elements has at most three control elements, and each of said groups of fuel assemblies has at most three fuel assemblies.

3. Nuclear reactor according to claim 2, wherein the cross section of said reactor core is approximately circular, and each two of said axes of symmetry define an angle therebetween being an integral multiple of 30°.

4. Nuclear reactor according to claim 1, wherein the cross section of said reactor core is substantially circular, and said reactor core has a hexagonal fuel rod grid structure.

5. Nuclear reactor according to claim 1, wherein said groups of control elements are a total of 61 groups of control elements having a total of 151 control elements,
13 of said groups of control elements each have one control element,
6 of said groups of control elements each have two control elements, and 42 of said groups of control elements each have three control elements.

6. Nuclear reactor according to claim 1, including connecting pieces each having said control elements of a respective one of said groups detachably retained thereon and each being movable by a respective one of said drive mechanisms.

7. Nuclear reactor according to claim 6, including a multi-armed guide plate in which said connecting piece is guided.

8. Nuclear reactor according to claim 7, wherein said multi-armed guide plate has adjacent arms defining an angle therebetween being a fraction of 360°, said fraction corresponding to the number of said arms.

9. Advanced pressurized water nuclear reactor with controlled power output, comprising a reactor core having a cross section in a given plane with a center of area and axes of symmetry passing through the center of area, a multiplicity of control elements disposed in groups, each of said groups having more than one of said control elements, said control elements of each of said groups being joined together, said groups being symmetrical to at least two of the axes of symmetry, drive mechanisms each moving a respective one of said groups of control elements, each of said control elements having a plurality of control rods, a support structure joining said control rods of a control element to one another, fuel assemblies disposed in groups, each of said groups of control elements having a given number of control elements being associated with one of said groups of fuel assemblies having the given number of fuel assemblies, and other fuel assemblies with which said control elements are not associated, said other fuel assemblies surrounding said groups of fuel assemblies.

* * * * *